UNITED STATES PATENT OFFICE.

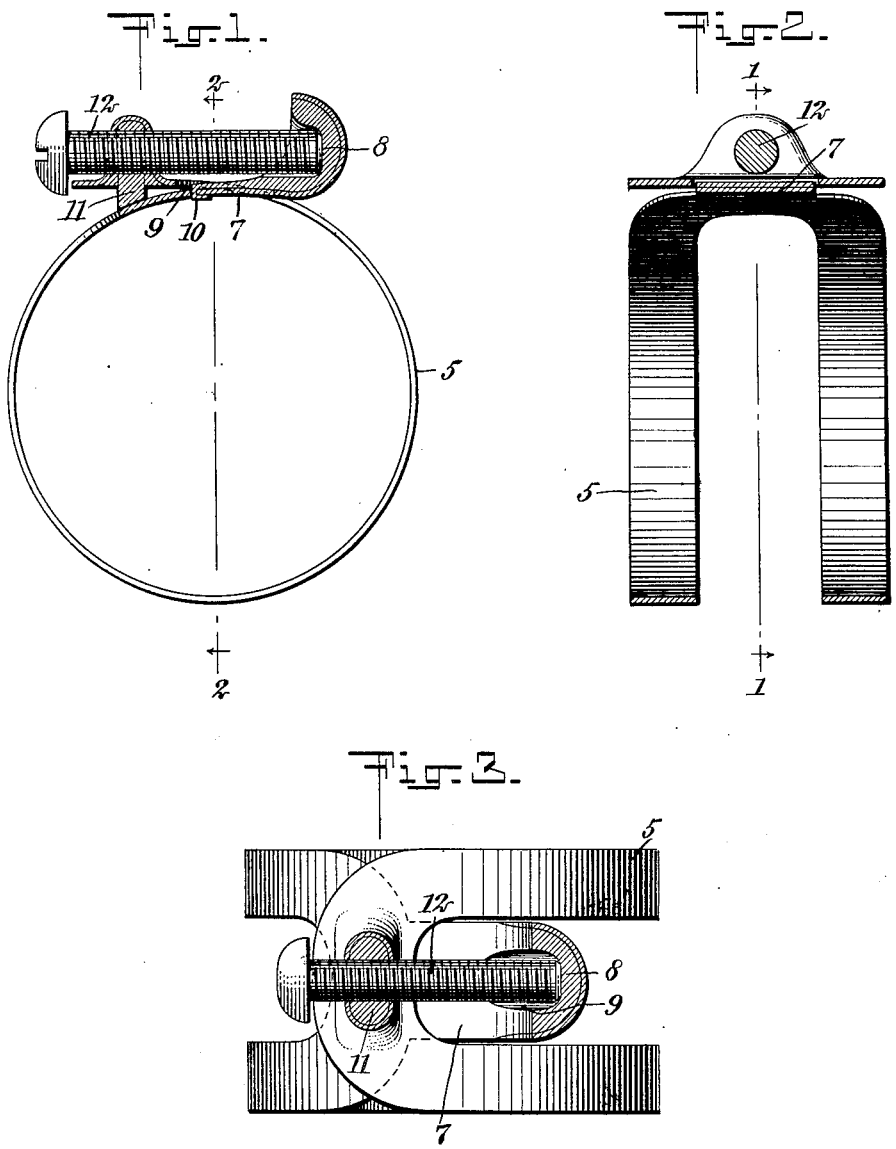

PETER E. ERICKSON, OF PORT CHESTER, NEW YORK.

HOSE-CLAMP.

No. 912,097.          Specification of Letters Patent.          Patented Feb. 9, 1909.

Application filed February 1, 1908. Serial No. 413,788.

*To all whom it may concern:*

Be it known that I, PETER E. ERICKSON, a citizen of the United States, and a resident of Port Chester, in the county of Westchester and State of New York, have invented a new and Improved Hose-Clamp, of which the following is a full, clear, and exact description.

This invention is an improvement in hose clamps of the character in which a screw operates to force the free ends of the clamp apart in contracting the diameter of its opening, as when tightening the clamp about the hose.

The object of the invention is to strengthen hose clamps of this nature at points subjected to the greatest strain, i. e., points where the nut for the screw is applied, and the bearing for the inner end of the screw; and further augment this strengthening by locating the screw as close to the perimeter of the clamp as practicable.

Reference is to be had to the accompanying drawings forming a part of this specification, in which similar characters of reference indicate corresponding parts in all the views.

Figure 1 is a central cross-section of a clamp embodying my invention, substantially on the line 1—1 of Fig. 2; Fig. 2 is a longitudinal section of the same on the line 2—2 of Fig. 1; and Fig. 3 is a plan of the clamp partly in section.

The clamp in its preferred construction is in the form of a loop 5, of one piece of thin flexible sheet metal, having a central longitudinal slot passing almost the complete circumference of the loop, dividing it into two spaced bands, the connecting portion at one end of said bands being extended as indicated at 7, and of reduced width to pass into the longitudinal slot, thus crossing the free ends of the loop. The reduced portion 7 of the clamp is cupped at its extremity, and is strengthened preferably by brazing into it a lining 8, likewise cupped but ordinarily of a heavier gage, the brazing being effected through an opening 9 formed in the cupped portion of the extension 7 near its center. The inner wall of the lining 8 is extended and has its extremity passed through an opening in the portion 7, where it is folded thereupon on its inner side as indicated at 10, and operates to prevent the lining from breaking loose from the brazing. The opposite free end of the loop is pressed outward to produce a knoll which receives a nut 11, this pressing of the metal being sufficient to bring the threaded bore of the nut in alinement with the opposite cupped end of the loop when the nut is inserted in place. The nut is brazed in the recess, and the walls thereof are cut out in alinement with the threaded bore of the nut in order that an adjusting screw 12 may be threaded therethrough, the inner end of this screw when threaded to position bearing in the cupped portion of the opposite end of the clamp.

It will be noted that the screw is located as close to the perimeter of the loop of the clamp as is practicable, whereby little leverage is afforded to the screw, tending to bend the cupped portion of the clamp and the bore of the nut out of alinement when the screw is tightened to draw the clamp about the hose. This, in connection with the manner of forming the bearing for the inner end of the screw, and the mode of anchoring the nut in place, produces a clamp having great strength at the point where it is subjected to the greatest strain and is most liable to break.

Having thus described my invention I claim as new and desire to secure by Letters Patent:

1. A hose clamp comprising a flexible loop having its free ends crossed, one of said ends being cupped and provided with a reinforcing lining, a projecting portion of which is passed through an opening in the loop and bent against the inner face thereof, and a screw having a threaded engagement with the opposite free end of the loop and bearing against said lining.

2. A hose clamp comprising a flexible loop having its free ends crossed, one of said ends being pressed out to form a knoll, and the other of said ends being cupped, a nut secured within said knoll, and a screw threaded through the nut and bearing on the cupped end of the loop.

3. A hose clamp comprising a flexible loop having one end thereof pressed out to form a knoll, a nut secured within said knoll, and a screw passing through the walls of the knoll, threaded through the nut and engaging the other end of the loop.

In testimony whereof I have signed my name to this specification in the presence of two subscribing witnesses.

PETER E. ERICKSON.

Witnesses:
HAZELTON WELLSTOOD,
JULIA R. REMSEN.